US010866829B2

United States Patent
Caliendo, Jr. et al.

(10) Patent No.: US 10,866,829 B2
(45) Date of Patent: Dec. 15, 2020

(54) PERFORMING DISRUPTIVE TASKS BASED ON USER STATE

(71) Applicant: LENOVO (Singapore) PTE. LTD., New Tech Park (SG)

(72) Inventors: Neal Robert Caliendo, Jr., Raleigh, NC (US); Antonio Bumarch, III, Cary, NC (US); Robert James Norton, Jr., Raleigh, NC (US); Arnold S. Weksler, Raleigh, NC (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 84 days.

(21) Appl. No.: 15/417,636

(22) Filed: Jan. 27, 2017

(65) Prior Publication Data

US 2018/0217865 A1    Aug. 2, 2018

(51) Int. Cl.
*G06F 9/48* (2006.01)

(52) U.S. Cl.
CPC ................. *G06F 9/4843* (2013.01)

(58) Field of Classification Search
None
See application file for complete search history.

(56) References Cited

U.S. PATENT DOCUMENTS

| | | | | |
|---|---|---|---|---|
| 2003/0074590 A1* | 4/2003 | Fogle | ............. | G06F 1/3203 713/320 |
| 2004/0081337 A1* | 4/2004 | Tsirkel | ............. | G06F 1/3203 382/118 |
| 2004/0225901 A1* | 11/2004 | Bear | ............. | G06F 1/3203 713/300 |
| 2005/0226468 A1* | 10/2005 | Deshpande | ............. | H04M 1/66 382/115 |
| 2012/0110360 A1* | 5/2012 | Lin | ............. | G06F 1/3215 713/324 |
| 2012/0303990 A1* | 11/2012 | Nanda | ............. | G06F 1/3228 713/324 |
| 2013/0124642 A1* | 5/2013 | Bansal | ............. | H04L 12/12 709/206 |
| 2013/0184031 A1* | 7/2013 | Pollington | ............. | H04W 88/02 455/556.1 |
| 2013/0191541 A1* | 7/2013 | Kishan | ............. | G06F 9/5011 709/226 |
| 2015/0370597 A1* | 12/2015 | Faaborg | ............. | G06F 9/46 718/102 |
| 2017/0017478 A1* | 1/2017 | Briggs | ............. | G06F 8/65 |
| 2017/0109206 A1* | 4/2017 | Wang | ............. | G06F 9/50 |

* cited by examiner

*Primary Examiner* — Dong U Kim
(74) *Attorney, Agent, or Firm* — Kunzler Bean & Adamson

(57) ABSTRACT

An apparatus for performing a disruptive task based on a user state is disclosed. The apparatus may include a processor and a memory that stores code executable by the processor to identify a disruptive task to be performed at the apparatus. The processor obtains biometric data from a user of the apparatus. The processor performs the disruptive task in response to the biometric data indicating a predetermined user state. A method and computer program product also perform the functions of the apparatus.

20 Claims, 6 Drawing Sheets

PERFORMING DISRUPTIVE TASKS BASED ON USER STATE

FIELD

The subject matter disclosed herein relates to task scheduling and more particularly relates to performing disruptive tasks based on a determined user state.

BACKGROUND

Description of the Related Art

Certain computer tasks are disruptive to the user due to being time and/or performance intensive. These tasks are often started at inopportune times; such tasks are typically scheduled based on calendar triggers, or idle time determination (e.g., lack of keyboard/mouse input for a predetermined timeout period). However, these triggers may initiate a disruptive task before the user is ready. For example, if the user tries to use the device when such a task starts, it can be annoying and impact his or her ability to utilize the computer.

BRIEF SUMMARY

An apparatus for performing a disruptive task based on a user state is disclosed. A method and computer program product also perform the functions of the apparatus.

The apparatus includes a processor and a memory that stores code executable by the processor. The processor identifies a disruptive task to be performed at the apparatus and obtains biometric data from a user of the apparatus. The processor further performs the disruptive task in response to the biometric data indicating a predetermined user state.

In certain embodiments, performing the disruptive task in response to the biometric data indicating a predetermined user state includes comparing the biometric data to a plurality of state profiles, identifying a user state from the comparison, and determining whether the identified state matches the predetermined user state. The predetermined user state may be one of sleep and physical exercise.

In some embodiments, identifying the disruptive task to be performed at the apparatus includes the processor identifying a task queued for execution on the apparatus and identifying task characteristics of the queued task. In such embodiments, the processor determines whether the task is a disruptive task based on the task characteristics. In one embodiment, identifying task characteristics of the queued task includes identifying an application initiating the task, wherein determining whether the task is a disruptive task includes the processor determining whether the initiating application is included in a list of disruptive applications. In another embodiment, identifying task characteristics of the queued task includes estimating system resource use of the task, the system resource including one or more of processor use, memory use, data storage retrieval rate, and network bandwidth, wherein determining whether the task is a disruptive task includes comparing the estimated system resource use to one or more system resource thresholds.

In certain embodiments, the processor further estimates a state duration for the predetermined user state, wherein performing the disruptive task further includes performing the disruptive task in response to determining that the disruptive task can be completed with an estimated state duration. In some embodiments, obtaining the biometric data includes receiving biometric data captured by a biometrics device separate from the apparatus. The biometric data may be one or more of: body temperature, heart rate, breathing rate, blood pressure, and body movement.

A method for performing a disruptive task based on a user state includes identifying, by use of a processor, a disruptive task to be performed at a computing device. The method also includes obtaining biometric data user of the computing device. The method further includes performing the disruptive task in response to the biometric data indicating a predetermined user state.

In certain embodiments, the method includes postponing the predetermined task in response to the biometric data indicating a second user state different than the predetermined state. Here, the disruptive task may be a task scheduled to be performed at the computing device. In some embodiments, performing the disruptive task in response to the biometric data indicating a predetermined user state includes comparing the biometric data to a plurality of state profiles, identifying a user state from the comparison, and determining whether the identified state matches the predetermined user state. In such embodiments, the predetermined user state may be one of a sleep state and a state of physical exertion.

In certain embodiments, the method includes determining whether the computing device is idle, wherein performing the disruptive task in response the biometric data indicating a predetermined user state further includes performing the disruptive task in response to the computing device being idle.

In one embodiment, identifying a disruptive task to be performed at the computing device includes identifying a task scheduled for execution at the computing device and determining whether the scheduled task is included in a list of disruptive tasks. In another embodiment, identifying a disruptive task to be performed at the computing device includes identifying a task scheduled for execution at the computing device, estimating system resource use of the task, and determining the scheduled task to be a disruptive task in response to the estimated system resource use exceeding one or more system resource thresholds. Here, the system resource may include one or more of processor use, memory use, data storage retrieval rate, and network bandwidth.

In some embodiments, obtaining the biometric data includes receiving biometric data captured by a biometrics device separate from the computing device, wherein the biometric data is selected from the group consisting of: body temperature, heart rate, breathing rate, blood pressure, and body movement. In certain embodiments, the method further includes setting a user's presence value for a messaging application running on the computing device in response to the biometric data indicating the predetermined user state.

The program product for performing a disruptive task based on a user state includes a computer readable storage medium that stores code executable by a processor. The program product includes code to identify a disruptive task to be performed at a computing device and obtain biometric data user of the computing device. The program product also includes code to perform the disruptive task in response to the biometric data indicating a first user state and to postpone the predetermined task in response to the biometric data indicating a second user state. Here, the first user state is different from the second user state. In certain embodiments, the first user state is one of sleep and physical exercise.

In certain embodiments, obtaining the biometric data includes receiving biometric data captured by a biometrics device separate from the computing device. Here, the biometric data may be one or more of: body temperature, heart rate, breathing rate, blood pressure, and body movement. In some embodiments, wherein identifying a disruptive task to be performed at the computing device includes identifying a task scheduled for execution at the computing device and estimating system resource use of the task. In such embodiments, identifying the disruptive task further includes determining the scheduled task to be a disruptive task in response to the estimated system resource use exceeding one or more system resource thresholds. Here, the system resource may be one or more of processor use, memory use, data storage retrieval rate, and network bandwidth.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
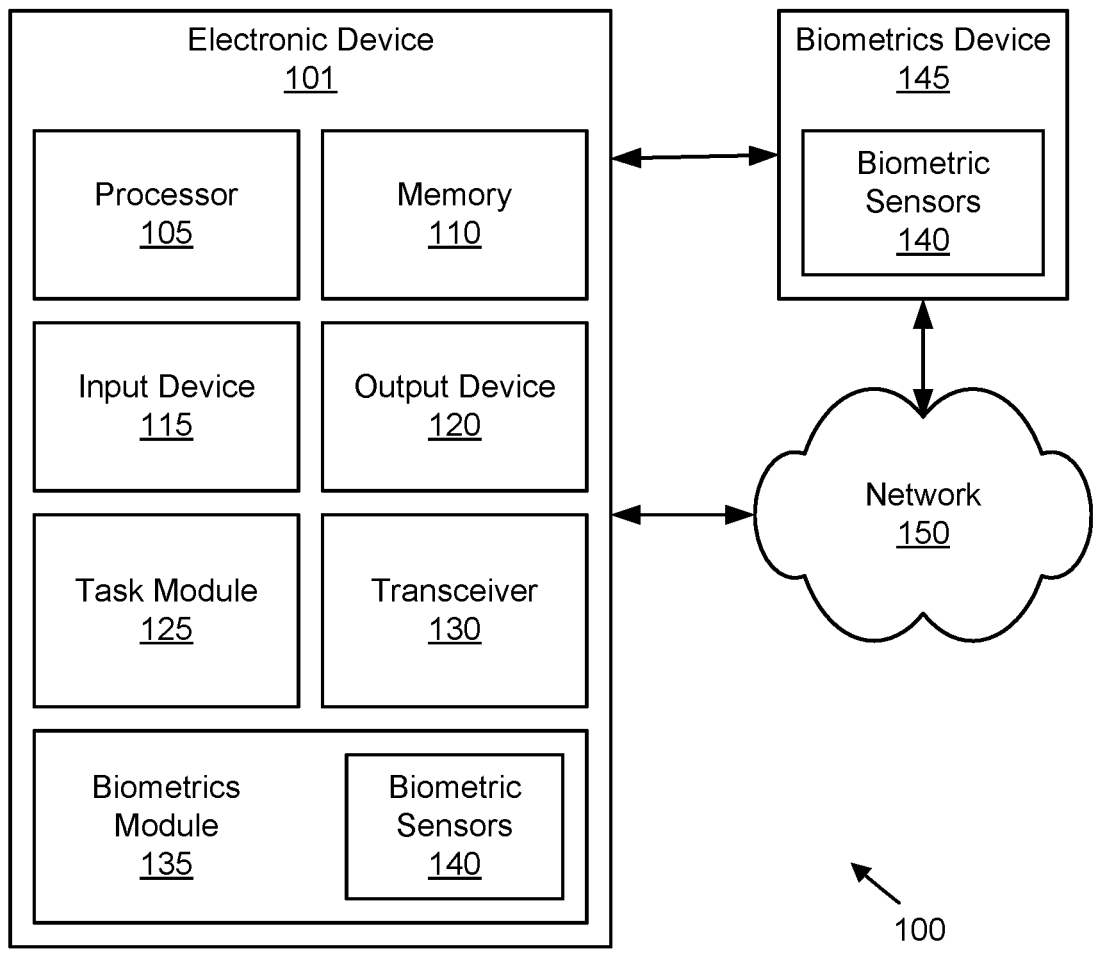
FIG. 1 is a schematic block diagram illustrating one embodiment of a system for triggering performance of a disruptive task based on a user state.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object-oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks. As used herein, a "computer" refers to any computing device capable of executing program code.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatuses, methods, and computer program products improve user experience by triggering performance of a disruptive task based on a user state determined using biometric data. Disruptive tasks are typically scheduled based on calendar triggers or idle time determination (e.g., lack of keyboard/mouse input for a predetermined timeout period). However, while these triggers decide when a task should start, they don't take into account the amount of time required to finish a task. For example, a user may typically go to sleep at 11 PM, so he may schedule a long, disruptive task to run at that time. However, if user decides to stay up late that night, then his or her experience will be disturbed by the disruptive task. Additionally, if a task triggers at idle time but user returns to his computer shortly thereafter, then his or her experience will also be disturbed by the disruptive task.

Consumers today have adopted multiple devices such as laptops, tablets, smartphones, wearable devices, etc. Communication between these devices is common. Wearable devices have the ability to detect aspects of a user's state, such as heart rate, blood pressure, breathing rate, and the like. The computing devices described herein use such biometric data to determine a user state, such as sleep. Non-available user states, such as sleep, are used as a trigger to launch tasks on a paired device that the user would not want to run while the device is in use. When a user goes to sleep, he or she typically is asleep for many hours, which is sufficient time to run demanding tasks. Sleep detection can also be used to reflect the user's online state to messaging apps, such as text, email, etc. Increased heart rate may be indicative of a person exercising, which could also be used as another trigger for certain types of disruptive tasks.

FIG. 1 depicts a system 100 for triggering performance of a disruptive task, according to embodiments of the disclosure. The system 100 includes an electronic device 101 having a processor 105, a memory 110, a task module 125, and a biometrics module 135. In certain embodiments, the system 100 may also include at least one biometrics device 145 paired to the electronic device 101. In certain embodiments, the electronic device 101 communicates with the biometrics device 145 using a direct connection (wired or wireless). Alternatively, the electronic device 101 and biometrics device 145 may communicate with one another over a data network 150.

The electronic device 101 comprises a processor 105, a memory 110, a task module 125, and a biometrics module 135. In certain embodiments, the electronic device 101 also includes an input device 115, an output device 120, a transceiver 130, and/or one or more biometric sensors 140. The electronic device 101 may include a body or an enclosure, with the components of the electronic device 101 being located within the enclosure. In one embodiment, the one or more biometric sensors 140 may be located at a surface of the enclosure. Additionally, the electronic device 101 may include a power source, for example a battery or a power adapter, that provides electrical power to components of the electronic device 101. In certain embodiments, the components of the electronic device 101 are communicatively coupled to each other, for example via a computer bus.

The processor 105, in one embodiment, may comprise any known controller capable of executing computer-readable instructions and/or capable of performing logical operations. For example, the processor 105 may be a microcontroller, a microprocessor, a central processing unit (CPU), a graphics processing unit (GPU), an auxiliary processing unit, a FPGA, or similar programmable controller. In some embodiments, the processor 105 executes instructions stored in the memory 110 to perform the methods and routines described herein. The processor 105 is communicatively coupled to the memory 110, the input device 115, the output device 120, the task module 125, and the transceiver 130. In certain embodiments, the processor 105 may perform the methods described herein.

The memory 110, in one embodiment, is a computer readable storage medium. In some embodiments, the memory 110 includes volatile computer storage media. For example, the memory 110 may include a random-access memory (RAM), including dynamic RAM (DRAM), synchronous dynamic RAM (SDRAM), and/or static RAM (SRAM). In some embodiments, the memory 110 includes non-volatile computer storage media. For example, the memory 110 may include a hard disk drive, a flash memory, or any other suitable non-volatile computer storage device. In some embodiments, the memory 110 includes both volatile and non-volatile computer storage media.

In some embodiments, the memory 110 stores data relating to performing a disruptive task based on biometric data. For example, the memory 110 may store task lists, task information, schedules, biometric data, user states, user state profiles, and the like. In some embodiments, the memory 110 also stores program code and related data, such as an operating system operating on the electronic device 101. In one embodiment, the biometrics module 135 may be embodied in an application operating on the electronic device 101. In another embodiment, the task module 125 may be embodied in an application operating on the electronic device 101.

The input device 115, in one embodiment, may comprise any known computer input device including a touch panel, a button, a keyboard, or the like. For example, the input device 115 may include a handwriting input unit operatively coupled to the processor 105. In some embodiments, the input device 115 may be integrated with the output device 120, for example, as a touchscreen or similar touch-sensitive display. In some embodiments, the input device 115 comprises a touchscreen such that text may be input by using a virtual keyboard displayed on the touchscreen and/or by handwriting on the touchscreen. In some embodiments, the input device 115 comprises two or more different devices, such as a keyboard and a touch panel. The input device 115 may include a microphone used to input sound or voice data (e.g., voice commands) and/or a camera for capturing images or otherwise inputting visual data.

The output device 120, in one embodiment, is configured to output visual, audible, and/or haptic signals. In some embodiments, the output device 120 includes an electronic display capable of outputting visual data to a user. For example, the output device 120 may include an LCD display, an LED display, an OLED display, a projector, or similar display device capable of outputting images, text, or the like to a user. In certain embodiments, the output device 120 includes one or more speakers for producing sound, such as an audible alert or notification. In some embodiments, the output device 120 includes one or more haptic devices for producing vibrations, motion, or other haptic feedback.

In some embodiments, all or portions of the output device 120 may be integrated with the input device 115. For example, the input device 115 and output device 120 may form a touchscreen or similar touch-sensitive display. As another example, the input device 115 and output device 120 may form a display that includes haptic response mechanisms. In other embodiments, the output device 120 may be located near the input device 115. The output device 120 may receive instructions and/or data for output from the processor 105 and/or the task module 125.

The task module 125, in one embodiment, is configured to identify a disruptive task schedule to be performed at the electronic device 101. Additionally, the task module 125 obtains biometric data relating to a user state from the biometrics module 135. In one embodiment, the task module 125 obtains biometric sensor data from the biometrics module 135 and analyses the same to determine a user state. In another embodiment, it is the biometrics module 135 that analyzes the biometric sensor data and outputs a user state to the task module 125.

The task module 125 is further configured to perform the disruptive task in response to the biometric data indicating a particular user state. Here the particular user state that triggers the disruptive task may be a sleep state, a state of physical exertion (e.g., an exercise state), or another non-available state. As used herein, a non-available state refers to a user state where the user is unlikely to use the electronic device 101, for example because they are engaged in another activity.

While the description generally uses sleep and exercise as examples of activities with the users unlikely to use electronic device 101, and other embodiments the non-available state may be triggered when the user engages in activities such as traveling (or driving) in a vehicle, reading, watching television or movie, and the like. Specific activities associated with non-available states depend on the user and the user's habits. For example, a first user may have a habit of checking his or her email while exercising on a treadmill device while a second user may have a habit of not using his or her electronic device while engaged in exercise.

In contrast to the non-available state, the determined user state may be a user ready state. As used herein, a user ready state refers to a user state where the user is likely to use electronic device even when not actively using the device.

As discussed above, whether particular activity is associated with a user ready state or a non-available state depends on the specific user's habits. In certain embodiments, the user is considered to be in a user ready state whenever the user is not in a non-available state, such as a sleep state or exercise state.

The task module 125 may be comprised of computer hardware, computer software, or a combination of both computer hardware and computer software. The task module 125 is discussed in further detail with reference to FIG. 2, below.

The transceiver 130, in one embodiment, is configured to send and to receive electronic communications via the data network 150. In certain embodiments, the transceiver 130 is a wireless transceiver capable of exchanging information via electromagnetic radiation (e.g., communication via radio frequencies, infrared, visible light, and the like) or sound (e.g., ultrasonic communication). In certain embodiments, the transceiver 130 is a wired transceiver capable of exchanging information via a transmission line (e.g., wire, data cable, or optical fiber). In some embodiments, the transceiver 130 receives biometric data from one or more biometrics devices 145. The transceiver may receive the biometric data via a direct connection to a biometrics device 145 or via the data network 150.

The biometrics module 135, in one embodiment, is configured to process sensor data from the one or more biometric sensors 140 to produce biometric data. For example, the biometrics module 135 may receive data signals from one or more heart rate sensors and derive a user heart rate from the sensor data. As another example, the biometrics module 135 may receive data signals from one or more temperature sensors and derive a user body temperature from the sensor data. The biometric data may include, but it not limited to, body temperature, heart rate, breathing rate, blood pressure, body movement, skin conductance, electrical potential, a stress-level measurement, perspiration data, brain wave data, muscle tone data, and/or eye movement data.

The biometrics device 145, in one embodiment, is a device paired to, but separate from the electronic device 101. The biometrics device 145 includes one or more biometric sensors 140 that collect biometric data indicative of the user's state. In some embodiments, the biometrics device 145 may be a dedicated biometric device, such as a heart rate monitor, breathing monitor, or the like. In other embodiments, the biometrics device 145 may be a device worn by the user such as a fitness tracker, that includes at least one biometric sensor 140.

The data network 150, in one embodiment, is a telecommunications network configured to allow the electronic device 101 and any biometrics device 145 to pass data to each other. The data network 150 may be comprised of wired data links, wireless data links, and/or a combination of wired and wireless data links. Examples of wireless data networks include, but are not limited to, a wireless cellular network, a local wireless network, such as a Wi-Fi® network, a Bluetooth® network, a near-field communication (NFC) network, an ad hoc network, and/or the like. The data network 150 may include a wide area network (WAN), a storage area network (SAN), a local area network (LAN), an optical fiber network, the internet, or other digital communication network. In some embodiments, the data network 150 may include two or more networks. The data network 150 may include one or more servers, routers, switches, and/or other networking equipment. The data network 150 may also include computer readable storage media, such as a hard disk drive, an optical drive, non-volatile memory, random access memory (RAM), or the like.

Figure 2:
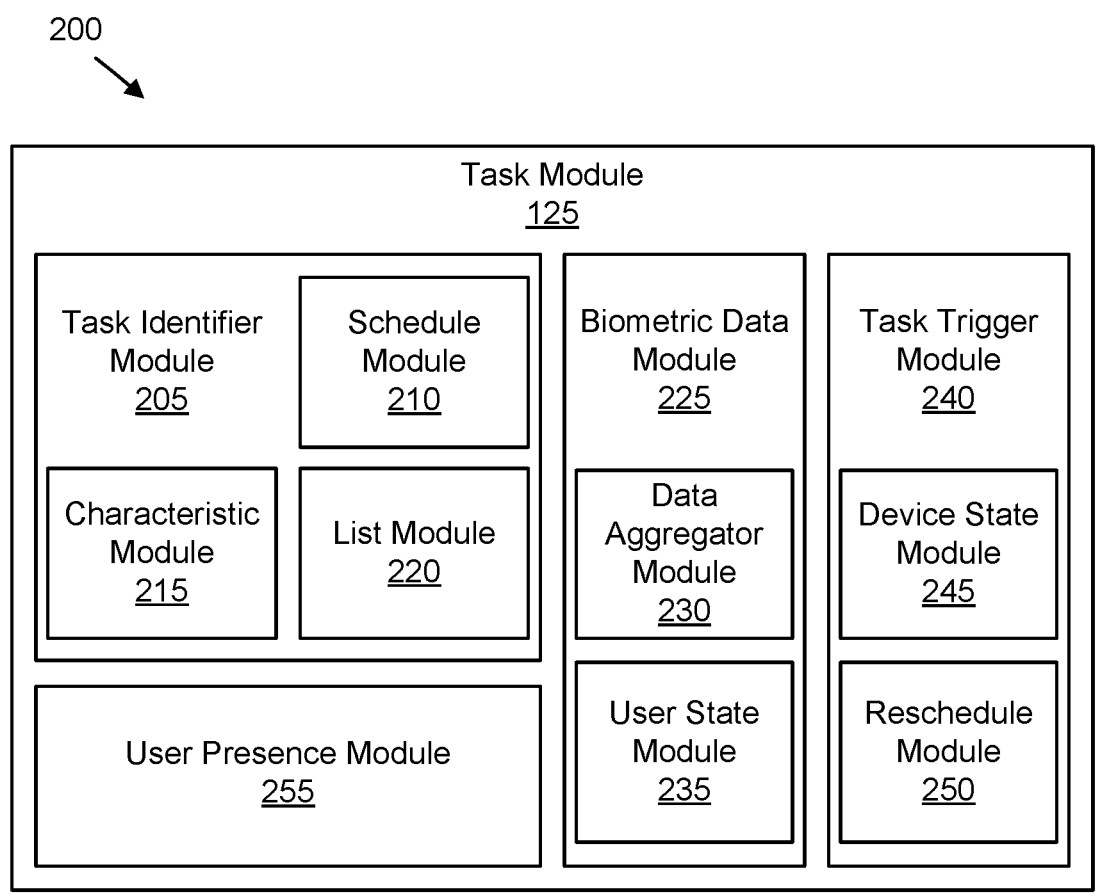
FIG. 2 is a schematic block diagram illustrating one embodiment of an apparatus for triggering performance of a disruptive task based on a user state.

FIG. 2 depicts a computing apparatus 200 for triggering performance of a disruptive task based on biometric data. In some embodiments, the computing apparatus 200 may include an embodiment of the task module 125 described above with reference to FIG. 1. In some embodiments, the computing apparatus 200 may be part of an electronic device, such as the electronic device 101.

In general, as described above, the computing device 200 identifies a disruptive task to be performed at an electronic device, obtains biometric data of a user of the apparatus, and performs the disruptive task in response to the biometric data indicating a predetermined user state. In one embodiment, the computing device 200 determines the user state from the biometric data by comparing the biometric data to one or more user state profiles. Where the user state is determined to be a non-available state, such as a sleep state or exercise state, then the computing device 200 triggers performance of the disruptive task. In certain embodiments, the computing device 200 may instead postpone the disruptive task where the user state is determined to be a user ready state.

As depicted, the task module 125 include a task identifier module 205, a biometric data module 225, and a task trigger module 240. The task identifier module 205 may include one or more of a schedule module 210, a characteristic module 215, and a list module 220. The biometric module 225 may include one or more of a data aggregator module 230 and a user state module 235. The task trigger module 240 may include one or more of a device state module 245 and a reschedule module 250. In some embodiments, the task module 125 also includes a user presence module 255. The various modules of the computing apparatus 200 may be communicatively coupled to one another.

The task identifier module 205, in one embodiment, is configured to identify a disruptive task to be performed at an electronic device (e.g., the electronic device 101). The task identifier module 205 may identify the disruptive tasks by comparing a task name or identifier to a list of known disruptive tasks, by examining task characteristics to determine whether task duration or estimated system use exceeds predetermined amounts, by determining whether an initiating application is known to initiate disruptive tasks. In the depicted embodiment, the task identifier module 205 includes a schedule module 210, a characteristic module 215, and a list module 220. In one embodiment, the task identifier module 205 contains circuitry for identifying disruptive tasks. In another embodiment, the task identifier module 205 is implemented using program code executed on the processor 105.

The schedule module 210, in one embodiment, is configured to identify a task scheduled to be performed on the electronic device. In one embodiment, the schedule module 210 analyzes a task queue for the processor 105. In another embodiment, the schedule module 210 examines a task scheduler listing scheduled (e.g., periodic) tasks. For example, the schedule module 210 may access a test scheduler provided by an operating system of the electronic device 101. Alternatively, the schedule module 210 may monitor (e.g., using a listener) applications (including the operating system) known to initiate disruptive tasks and compile a list of periodic disruptive tasks.

The schedule module 210 may cooperate with the list module 220 to determine whether a scheduled task is a known disruptive task, as discussed below. The schedule module 210 may be implemented using hardware circuitry, program code executed on the processor 105, or combinations thereof. While depicted as a component of the task identifier module 205, in certain embodiments the schedule module 210 may be a separate module within the task module 125.

The characteristic module 215, in one embodiment, is configured to identify task characteristics of a task scheduled to be performed on the electronic device. Task characteristics may include, but are not limited to, a task identifier, an initiating application (or process), an estimated duration, an estimated system resource usage, and the like. The estimated system resource may be one or more of processor usage (e.g., CPU time), memory usage, data storage retrieval rate (e.g., disk transfer rate), network bandwidth, and the like.

Upon identifying the task characteristics, the task identifier module 205 and/or the characteristic module 215 may compare the characteristics to certain values in order to determine whether the task scheduled to be performed is a disruptive task. For example, a task may be classified as a disruptive task if its estimated system resource use exceeds one or more system resource threshold and/or if its estimated duration exceeds a duration threshold. As another example, a task may be classified as a disruptive task if its identifier matches an entry in a list of disruptive tasks and/or if its initiating application matches an entry in a list of disruptive applications (e.g., antivirus programs, backup programs, etc.).

The system resource threshold may be absolute amount (e.g., 2 GB of RAM) or percentage (e.g., 25% of CPU cycles). In certain embodiments, the system resource threshold is specific to the electronic device 101 (e.g., specific to the system resources of the electronic device 101), such that different devices may use different system resource thresholds. The characteristic module 215 may be implemented using hardware circuitry, program code executed on the processor 105, or combinations thereof. While depicted as a component of the task identifier module 205, in certain embodiments the characteristic module 215 may be a separate module within the task module 125.

The list module 220, in one embodiment, is configured to store and maintain a list of disruptive tasks. The task identifier module 205 and/or the list module 220 may compare a task to be performed to the list of disruptive tasks to identify a disruptive task to be performed. In one embodiment, the list module 220 creates a database or other suitable data storage structure to store the list of disruptive tasks. The list of disruptive tasks may identify each task, for example using a name, an identification number (e.g., a process identifier ("PID"), a calling (e.g., initiating) application or process, another suitable identifier, and combinations thereof. The listed identifier (or combination of identifiers) uniquely identify each disruptive task and can be used to efficiently determine whether a scheduled task is a disruptive task. In certain embodiments, the list module 220 adds a task to the list of disruptive tasks in response to the task identifier module 205 and/or characteristic module 215 determining that at task to be performed is a disruptive task.

The list module 220 may also store and maintain a list of disruptive applications. As used herein, a disruptive application refers to a computer program that calls (e.g., initiates) a disruptive task. The task identifier module 205 and/or the list module 220 may compare application initiating a task to the list of disruptive applications. Here a task initiated by a disruptive application may be further scrutinized (e.g., by comparing task characteristics). The list module 220 may be implemented using hardware circuitry, program code executed on the processor 105, or combinations thereof. While depicted as a component of the task identifier module 205, in certain embodiments the list module 220 may be a separate module within the task module 125.

The biometric data module 225, in one embodiment, is configured to obtain biometric data from a user of the electronic device. The biometric data may include body temperature, heart rate, breathing rate, blood pressure, and body movement. Body movement data may include translational and/or rotational movement data, including position and derivatives of position, such as velocity, acceleration, and the like. Body movement data may include step count and/or a step rate. In certain embodiments, the biometric data may also include skin conductance, electrical potential, a stress-level measurement, perspiration data, brain wave data, muscle tone data, and/or eye movement data.

The biometric data module 225 obtains the biometric data from the biometrics module 135 and/or from the biometrics device 145. For example, the biometrics device 145 past raw sensor data to the biometrics moderate 135, but may pass formatted biometric data (e.g., heart rate, breathing rate, etc.) to the biometrics data module 225. In certain embodiments, the biometric data module 225 may store biometric data history. The biometric data module 225 may be implemented using hardware circuitry, program code executed on the processor 105, and combinations thereof.

The data aggregator module 230, in one embodiment, is configured to aggregate biometric data from a plurality of sources (e.g., sensors). In certain embodiments, the data aggregator module 230 receives several types of biometric data from the plurality of sources. For example, the data aggregator module 230 may receive one type of biometric data from the biometrics module 135 and another type of biometric data from a biometric device 150. As another example, the data aggregator module 230 may receive multiple types of biometric data in the biometrics module 135. Did aggregator module 230 may establish timestamps for the received biometric data so the biometric data of different types may be examined at a particular moment in time or over particular period.

In some embodiments, the data aggregator module 230 also stores biometric data history. For example, the data aggregator module 230 may store, either locally or at a remote site, the aggregated biometric data in a database. The data aggregator module 230 may be implemented using hardware circuitry, program code executed on the processor 105, or accommodations thereof. While depicted as a component of the biometric data module 225, in certain embodiments the data aggregator module 230 may be a separate module within the task module 125.

In one embodiment, the biometric data history may be used to train the user state module 235 to determine a user state from current biometric data. In another embodiment, the biometric data history may be used to estimate the duration of a particular user state. For example, the biometric data history may be used to estimate how long the user will be in an exercise state or a sleep state. The estimated duration may be used by the task trigger module 240 in selecting a disruptive task to perform.

The user state module 235, in one embodiment, is configured to determine a user state from the biometric data. In certain embodiments, the user state module 235 uses biometric data history to identify distinct user states. The different user states may be distinguished by having biometric data within specific ranges. For example, a sleep state may be characterized by a heart rate, breathing rate, and/or body temperature being within the first range, an exercise state may be characterized by heart rate, breathing rate, and/or body temperature within a second range, and a user ready state may be characterized by a heart rate, breathing rate, and/or body temperature within a third range. Alternatively, the user ready state may be characterized by heart rate, breathing rate, and/or body temperature not being within either the first range or the second range. In further embodiments, additional biometric data may be used to distinguish one user state from another.

In some embodiments, the user state module 235 compares the biometric data to one or more user state profiles and determine a user state from the comparison. The user state module 235 may access one or more stored profiles associated with non-available states. For example, a sleep profile may have a range of heart rates, breathing rates, body temperatures, etc. indicative of the sleep state and the user state module may compare available biometric data to the values in the sleep profile to determine if the user is likely in the sleep state. Similarly, an exercise profile may have a range of heart rates, breathing rates, body temperatures, etc. indicative of a state of physical exertion and the user state module may compare available biometric data to the values in the exercise profile to determine if the user is likely in the exercise state. In one embodiment, the user state module 235 creates the different user state profiles based on the biometric data history.

Here the sleep state and the exercise state are examples of non-available states where the user is unlikely to be about to use the electronic device. The user state module 235 may also compare the biometric data to one or more user ready profiles to determine whether the user is in a state where they are ready to use the electronic device. Alternatively, the user state module 235 may determine that the user is in a ready state if the biometric data does not match the sleep profile, the exercise profile, or the profile of another state where the user is unlikely to be about to use the electronic device.

In one embodiment, the user state module 235 contains circuitry for determining the user state. In another embodiment, the user state module 235 is implemented using program code executed on the processor 105. While depicted as a component of the task identifier module 205, in certain embodiments the user state module 235 may be a component of the task trigger module 240 or may be a separate module within the task module 125.

The task trigger module 240, in one embodiment, is configured to perform a disruptive task in response to the biometric data indicating a predetermined user state. For example, the task trigger module 240 may signal the processor 105 to perform a disruptive task in response to the user state being in a non-available state, such as a sleep state or an exercise state. The task trigger module 240 may be implemented using hardware circuitry, program code executed on the processor 105, or combinations thereof.

In one embodiment, the task trigger module 240 determines a user state from the biometric data received by the biometric data module 225. Here, the task trigger module 245 may include an instance of the user state module 235, described above, for comparing the biometric data to one or more user state profiles, identify a user state from the comparison, and determine whether the identified user state matches the predetermined user state. In other embodiments, the task trigger module 240 receives an indication of the user state, for example from another instance of the user state module 235.

In certain embodiments, the task trigger module 240 may check to ensure that the electronic device 101 is an idle state before performing the disruptive task. For example, the user may use the electronic device 101 to play music while exercising. In such a scenario, the task trigger module 240 may determine that the electronic device 101 is in use (e.g., not in an idle state) and forgo performing the disruptive task even when the biometric data indicates that the user is in an exercise state.

In further embodiments, the task trigger module 240 may determine whether performing the disruptive task will interrupt the user experience before performing the disruptive task. Thus, in the above example, the task trigger module 240 may determine that performing an antivirus scan would not interrupt music playback and thus perform the antivirus scan (e.g., disruptive task) in response to the biometric data indicating that the user is an exercise state. However, the task trigger module 240 may determine that updating a media player application or an operating system of the electronic device 101 would interrupt the music playback and thus not perform the update.

The device state module 245, in one embodiment, is configured to identify a device state of the electronic device 101. For example, the device state module 245 may determine whether the electronic device 101 is in an idle state. As described above, the task trigger module 240 may forgo performing a disruptive task when the biometric data indicates the user is in a non-available state, such as an exercise state, but the electronic device 101 is being used for media playback, or is otherwise not in an idle state. The device state module 245 may be implemented using hardware circuitry, program code executed on the processor 105, or combinations thereof. While depicted as a component of the task trigger module 240, in other embodiments the device state module 245 may be a separate module within the task module 125.

In certain embodiments, the device state module 245 determines whether the electronic device 101 is in a limited use state where performing the disruptive task will not interrupt the user experience. Examples of limited use states include, but are not limited to, media playback, file transfer, and the like. A limited use state is characterized by an activity being performed on the electronic device 101 but without the user actively interacting with the device (e.g., interacting with the user interface of the device). Certain disruptive tasks may be performed while the devices in a limited use state without interrupting the activity being performed. Thus, the device state module 245 may determine whether the electronic device 101 is in a limited use state such that the task trigger module 240 may perform certain disruptive tasks.

The reschedule module 250, in one embodiment, is configured to postpone a disruptive task in response to the biometric data indicating that the user is in a user ready state. For example, the reschedule module 245 postpones the disruptive task until the user state changes. Alternatively, the reschedule module 250 may automatically postpones a disruptive task in response to the biometric data indicating that the user is not in a non-available state, such as the sleep state or exercise state. The reschedule module 250 may be implemented using hardware circuitry, program code executed on the processor 105, or combinations thereof. While depicted as a component of the task trigger module 240, in other embodiments the reschedule module 250 may be a separate module within the task module 125.

In some embodiments, the reschedule module 250 may postpone the disruptive task for a preset amount of time. The preset amount of time may be based on a frequency at which the disruptive task is performed. For example, a daily task, such as an antivirus scan, maybe postpone for an hour, two hours, or the like. As another example, a weekly task, such as a data backup, may be postponed for an hour, a day, or the like. In other embodiments, the reschedule module 250 may postpone the disruptive task until the next scheduled performance. For example, the daily task may be postponed until the next day while the weekly task may be postponed until the next week.

The user presence module 255, in one embodiment, is configured to adjust a user's online presence based on the biometric data. In one embodiment, when the user is in a sleep state, exercise state, or similar non-available state, the user presence module 250 may change the user's online presence to indicate that the user is unavailable. For example, the user presence module 255 may change a status indicator for a messaging platform (e.g., instant messaging) to indicate that the user is busy, away from the device, unavailable, etc.

In another embodiment, the user presence module 255 may place the electronic device in a "do not disturb" mode that suppresses receipt of or suppresses alerts for incoming messages in response to the user being in a non-available state, such as the sleep state. The user presence module 255 may also changes status indicator for one or more messaging platforms to "do not disturb" in response to the user being in the sleep state. In certain embodiments, the may log the user out of an open session. The user presence module 255 may be implemented using hardware circuitry, program code executed on the processor 105, or combinations thereof.

Figure 3:
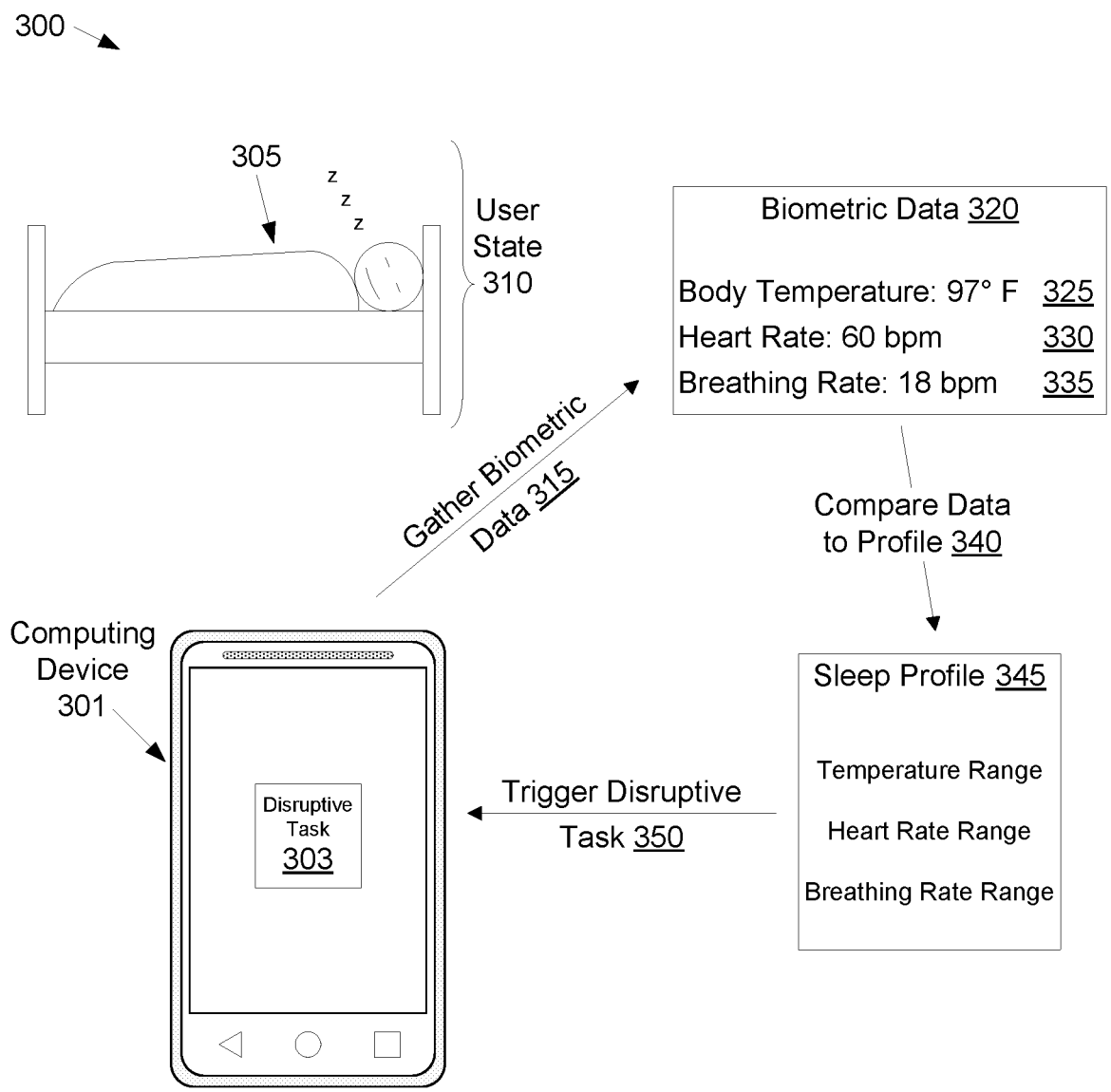
FIG. 3 is a diagram illustrating a first example of an electronic device for triggering performance of a disruptive task based on a user state determined using biometric data.

FIG. 3 depicts a first scenario 300 of a computing device 301 for triggering performance of a disruptive task based on biometric data, according to embodiments of the disclosure. The computing device 301 may be one embodiment of the electronic device 101. The computing device 301 identifies a disruptive task 303 scheduled to be performed at the computing device 301. Additionally, the computing device 301 obtains biometric data 320 relating to a user state 310 and triggers performance of the disruptive task 303 in response to the biometric data 320 indicating a particular user state, here a sleep state.

As depicted, in the first scenario 300 the user 305 is in a sleep state. The computing device 301 determines the user state 310 by gathering 315 biometric data 320. In one embodiment, the computing device 301 includes biometric sensors that provide the biometric data 320. In a further embodiment, the computing device 301 may communicate with a fitness tracker, health monitor, or other biometric device 150 to obtain the biometric data 320. Here, the biometric data 320 includes a first body temperature 325, a first heart rate 330, and a first breathing rate 335. In other embodiments, the biometric data 320 may include additional data, as described herein.

The computing device 301 further compares 340 the biometric data 320 to one or more user state profiles. In the depicted embodiment, the computing device 301 compares 340 the biometric data 320 to a sleep profile 345. The computing device 301 may compares 340 the biometric data 320 to additional user state profiles (not shown). The sleep profile 345 is personalized to the user 305 and includes body temperature ranges, heart rate ranges, and breathing rate ranges indicative of the user 305 being asleep (e.g., being in the sleep state). In certain embodiments, the sleep profile 345 may include additional values or ranges for other types of biometric data useful to distinguish the sleep state from other user states.

In the first scenario 300, the biometric data 320 matches the values/ranges in the sleep profile 345. Thus, the computing device 301 determines that the user state 310 is the sleep state. Because the user state 310 is a non-available state (e.g., a state where the user is unlikely to use the computing device 101), the computing device 301 triggers 350 performance of the disruptive task 303. Triggering 350 performance of the disruptive task 303 may include allowing the disruptive task 303 to run according to schedule.

Figure 4:
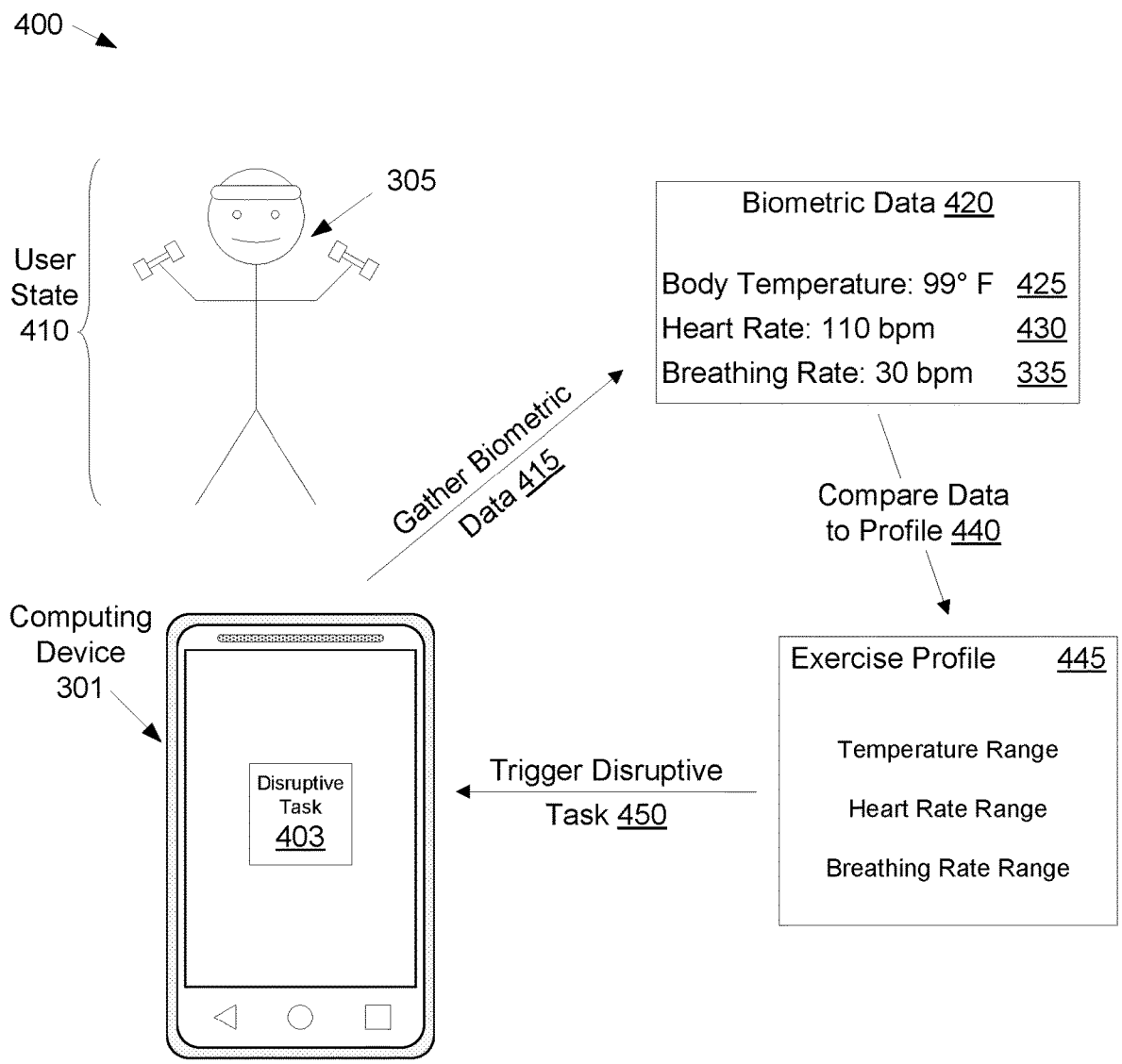
FIG. 4 is a diagram illustrating a second example of an electronic device for triggering performance of a disruptive task based on a user state determined using biometric data.

FIG. 4 depicts a second scenario 400 of the computing device 301 triggering performance of a disruptive task based on biometric data, according to embodiments of the disclosure. The computing device 301 identifies a disruptive task 403 scheduled to be performed at the computing device 301. Additionally, the computing device 301 obtains biometric data 415 relating to a user state 410 and triggers performance of the disruptive task 403 in response to the biometric data indicating a particular user state, here an exercise state.

As depicted, in the second scenario 400 the user 305 is exercising. The computing device 301 determines the user state 410 by gathering 415 biometric data 420. Here, the biometric data 420 includes a second body temperature 425, a second heart rate 430, and a second breathing rate 335. In other embodiments, the biometric data 420 may include additional data, as described herein.

The computing device 301 further compares 440 the biometric data 420 to one or more user state profiles. In the depicted embodiment, the computing device 301 compares 440 the biometric data 420 to an exercise profile 445. The computing device 301 may compares 440 the biometric data 420 to additional user state profiles (not shown). The sleep profile 445 is personalized to the user 305 and includes body temperature ranges, heart rate ranges, and breathing rate ranges indicative of the user 305 being physically active (e.g., during physical exercise). In certain embodiments, the exercise profile 445 may include additional values or ranges for other types of biometric data useful to distinguish the exercise state from other user states.

In the second scenario 400, the biometric data 420 matches the values/ranges in the exercise profile 445. Thus, the computing device 301 determines that the user state 410 is the exercise state. Because the user state 410 is a non-available state (e.g., a state where the user is unlikely to use the computing device 101), the computing device 301 triggers 450 performance of the disruptive task 403. Triggering 350 performance of the disruptive task 403 may include allowing the disruptive task 403 to run according to schedule. Here, the computing device may only trigger a disruptive task 403 that can be performed in a typical exercise period. For example, if the user 305 typically exercises for 30 minutes at a time, the computing device 301 may only perform a disruptive task 403 that can be completed while the user is exercising (e.g., in the 30 minute window).

Figure 5:
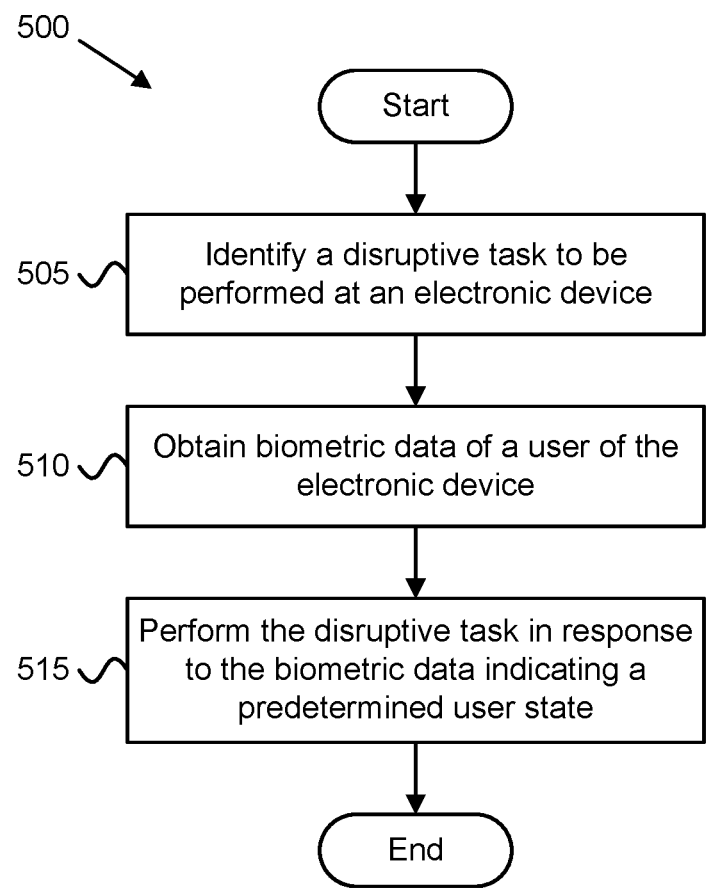
FIG. 5 is a schematic flow chart diagram illustrating one embodiment of a method for triggering performance of a disruptive task based on a user state.

FIG. 5 depicts a method 500 for triggering performance of a disruptive task, according to embodiments of the disclosure. In some embodiments, the method 500 is performed using a computing device, such as the electronic device 101, the task module 125, the apparatus 200, and/or the computing device 301, described above. In some embodiments, the method 500 is performed by a processor, such as a microcontroller, a microprocessor, a central processing unit (CPU), a graphics processing unit (GPU), an auxiliary processing unit, a FPGA, or the like.

The method 500 begins and identifies 505 a disruptive task to be performed at an electronic device. For example, the task identifier module 205 may identify disruptive task that is scheduled on the electronic device. In some embodiments, identifying 505 the disruptive task includes identifying a scheduled task or a task in a task queue. Identifying 505 the disruptive task may also include comparing task characteristics to determine whether the task is a disruptive task. Task characteristics may include a task name, a task identifier, an initiating application or process, an estimated duration, an estimated system resource use, and the like.

The method 500 includes obtaining 510 biometric data of the user of the electronic device. For example, the biometrics module 135 and/or the biometric data module 225 may acquire biometric data relating to a user state of the user. In certain embodiments, one or more biometric sensors are located on a biometrics device 145 that is remote from the electronic device at which the disruptive task is to be performed. Here, the biometrics device 145 transmits biometric data, for example to the biometrics module 135.

The method 500 includes performing 515 the disruptive task in response to the biometric data indicating a predetermined user state. For example, the task module 125 may identify a user state from the biometric data and determine whether the identified user state matches one or more predetermined user states. Here, the electronic device performs 515 disruptive task when the identified user state indicates the user is likely not about to use the electronic device. Examples of such predetermined user states include, but are not limited to, a sleep state, an exercise state, or another non-available state. The method 500 ends.

In certain embodiments, the method 500 may include postponing the disruptive task in response to the biometric data not indicating the predetermined user state. For example, if the biometric data indicates that the user is in a ready state (and thus likely to use the electronic device), then the disruptive task will be postponed. In one embodiment, the disruptive task is postponed for preset amount of time. Here, a disruptive task is performed on a weekly basis, such as a backup of user data, maybe is postponed for an hour, a day, or another preset amount of time. In another embodiment, the disruptive task is postponed until next (prescheduled) occurrence. Thus, a disruptive task that is performed on a daily basis, such as an antivirus scan, may be postponed for another day. Additionally, when the postponed disruptive task is to be performed again, the method 500 may include again obtaining biometric data and either performing or again postponing the disruptive task based on the user state.

Figure 6:
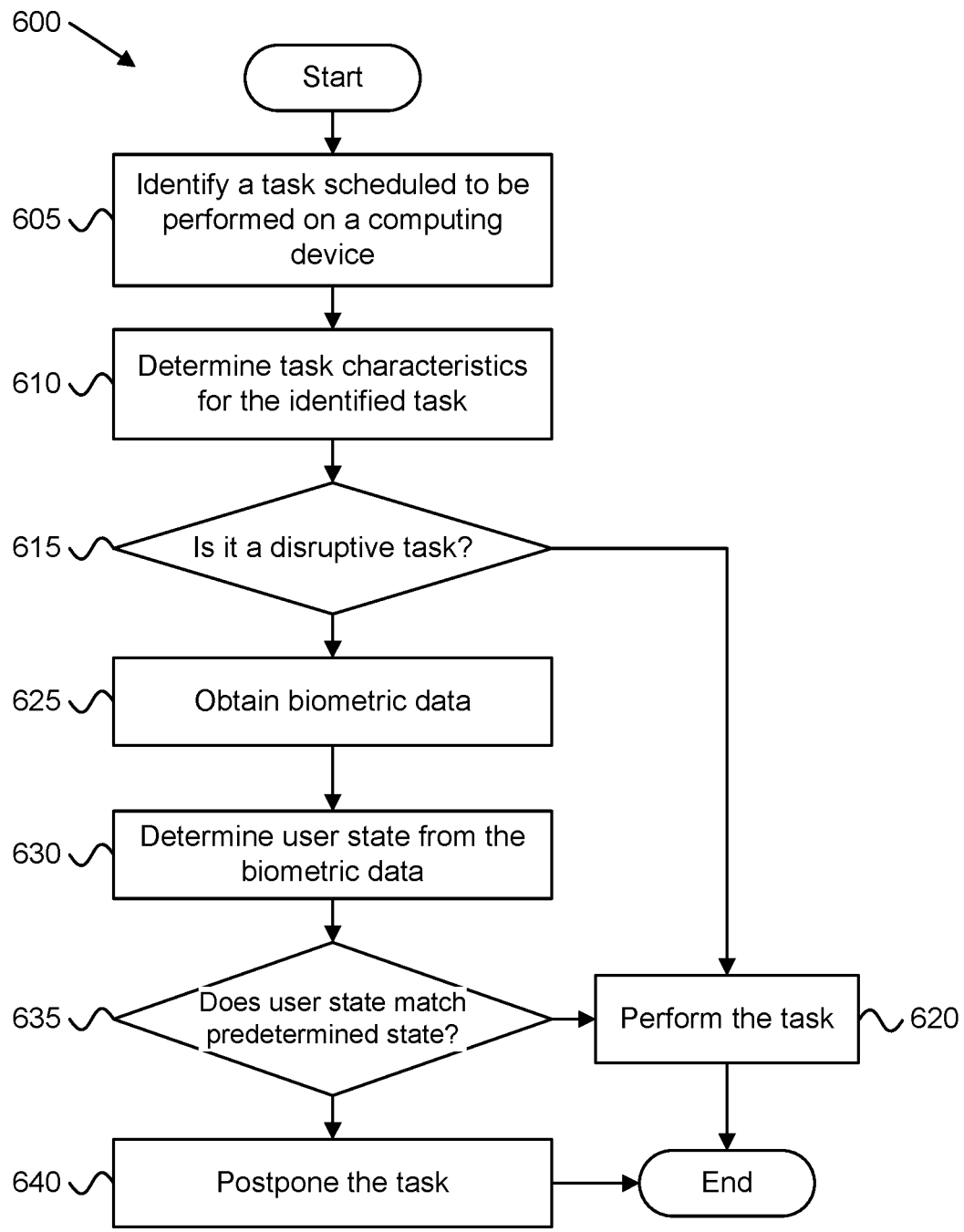
FIG. 6 is a schematic flow chart diagram illustrating another embodiment of a method for triggering performance of a disruptive task based on a user state.

FIG. 6 depicts a method 600 for triggering performance of a disruptive task, according to embodiments of the disclosure. In some embodiments, the method 600 is performed using a computing device, such as the electronic device 101, the task module 125, the apparatus 200, and/or the computing device 301, described above. In some embodiments, the method 600 is performed by a processor, such as a microcontroller, a microprocessor, a central processing unit (CPU), a graphics processing unit (GPU), an auxiliary processing unit, a FPGA, or the like.

The method 600 begins and identifies 605 a task scheduled to be performed on a computing device, such as the electronic device 101. In one embodiment, identifying 605 a test scheduled to be performed includes examining a task queue for tasks queued for execution at a processor of the computer device, such as the processor 105. In another embodiment, identifying 605 a task scheduled to be performed includes accessing a task scheduler. In yet another embodiment, identifying 605 a task schedule be performed includes monitoring one or more applications known to initiate disruptive tasks (e.g., monitoring disruptive applications).

The method 600 determines 610 task characteristics for the identified task. In one embodiment, determining 610 task characteristics includes identifying a task name or task identifier. In another embodiment, determining 610 task characteristics includes identifying an estimated system resource use. For example, the system resource may be one or more of processor use (e.g., CPU time), memory use (e.g., RAM requirement), data storage retrieval rate (e.g., disc access rate), and network bandwidth.

The method 600 determines 615 whether the identified task is a disruptive task based on the task characteristics. For example, determining 615 whether the identified task is a disruptive task may include comparing the task name or task identifier to a list of known disruptive tasks. As another example, determining 615 whether the identified task is a disruptive task may include comparing the estimated system resource use to one or more system resource thresholds.

In response to determining 615 that the identified task is not a disruptive task, the method 600 performs 620 the identified task. Performing 620 the identified task may include executing the identified task at the scheduled time. Alternatively, performing 620 the identified task may include executing the identified task once it reaches the head of the task queue.

In response to determining 615 that the identified task is a disruptive task, the method 600 obtains 625 biometric data of the user of the computing device. In one embodiment, obtaining 625 biometric data includes receiving sensor data from one or more biometric sensors within the computing device. In another embodiment, obtaining 625 biometric data includes receiving sensor data from one or more biometric sensors located in the biometric device that is separate from the computing device.

The method 600 determines 630 a user state from the biometric data. In some embodiments, determining 630 the user state from the biometric data includes comparing the biometric data to one or more user state profiles. In one embodiment, determining 630 the user state from the biometric data includes determining whether the biometric data indicates the user to be in a non-available state, such as a sleep state or exercise state. In another embodiment, determining 630 the user state from the biometric data includes determining whether the biometric data indicates the user to be in a user ready state.

The method 600 determines 635 whether the user state matches a predetermined state. Here the predetermined state is a non-available state, such as the sleep state or exercise state. In response to the user being in the non-available state, such as the sleep state or exercise state, the method 600 performs 620 the identified task. Otherwise, in response to the user not being in the non-available state (e.g., in response to the user being in a user ready state), the method 600 postpones 640 the identified task. Postponing 640 the identified task may include postponing the task for preset time or until the next scheduled occurrence of the identified task. The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
   identify a task that is scheduled to be performed at the apparatus at a particular time, the task scheduled based on one or more of a calendar trigger and an idle time determination;

determine whether the scheduled task is a disruptive task based on an estimated system resource use of the scheduled task, wherein the scheduled task is determined to be a disruptive task in response to the scheduled task having an estimated system resource use that exceeds one or more system resource thresholds, the system resource comprising one or more of processor use, memory use, and data storage retrieval rate;

obtain biometric data of a user of the apparatus;

determine whether the user is in a predetermined user state using the biometric data;

reschedule the disruptive task in response to the biometric data indicating that the user is not in the predetermined user state;

estimate a state duration for the predetermined user state in response to the user being in the predetermined user state;

determine whether the disruptive task can be completed within the estimated state duration;

reschedule the disruptive task in response to determining that the disruptive task cannot be completed within the estimated state duration;

determine whether an apparatus state is an idle state;

reschedule the disruptive task in response to the apparatus state not being in the idle state;

determine a new apparatus state in response to the biometric data indicating that the user is in a non-available state and in response to determining that the apparatus is in a limited use state based on one or more activities being performed on the apparatus while the biometric data indicates that the user is in the non-available state; and perform the disruptive task at the rescheduled time in response to the biometric data indicating that the user is in the predetermined user state and in response to determining that the disruptive task can be completed within the estimated state duration and in response to the new apparatus state being the limited use state.

2. The apparatus of claim 1, wherein determining whether the user is in a predetermined user state using the biometric data comprises:

comparing the biometric data to a plurality of user state profiles;

identifying a user state from the comparison; and determining whether the identified user state matches the predetermined user state.

3. The apparatus of claim 2, wherein the predetermined user state is one of sleep and physical exercise.

4. The apparatus of claim 1, wherein the task is queued for execution on the apparatus, wherein determining whether the task is a disruptive task further comprises:

identifying task characteristics of the queued task; and determining whether the task is a disruptive task based on the task characteristics.

5. The apparatus of claim 1, further comprising identifying an application initiating the task, wherein determining whether the scheduled task is a disruptive task includes determining whether the initiating application is included in a list of disruptive applications.

6. The apparatus of claim 1, wherein the processor further estimates the state duration for the predetermined user state based on biometric data history.

7. The apparatus of claim 1, wherein obtaining the biometric data comprises receiving biometric data captured by a biometrics device separate from the apparatus, wherein the biometric data is selected from the group consisting of: body temperature, heart rate, breathing rate, blood pressure, and body movement.

8. The apparatus of claim 1, wherein the processor sets a user's presence value for a messaging application running on the apparatus in response to the biometric data indicating the predetermined user state.

9. A method comprising:

identifying, by use of a processor, a task that is scheduled to be performed at an electronic device at a particular time, the task scheduled based on one or more of a calendar trigger and an idle time determination;

determining whether the scheduled task is a disruptive task based on an estimated system resource use of the scheduled task, wherein the scheduled task is determined to be a disruptive task in response to the scheduled task having an estimated system resource use that exceeds one or more system resource thresholds, the system resource comprising one or more of processor use, memory use, and data storage retrieval rate;

obtaining biometric data of a user of the electronic device;

determining whether the user is in a predetermined user state using the biometric data;

rescheduling the disruptive task in response to the biometric data indicating a second user state different than the predetermined state;

estimating a state duration for the predetermined user state in response to the user being in the predetermined user state;

determining whether the disruptive task can be completed within the estimated state duration;

rescheduling the disruptive task in response to determining that the disruptive task cannot be completed within the estimated state duration;

determining whether a state of the electronic device is an idle state;

rescheduling the disruptive task in response to the state of the electronic device not being an idle state;

determining a new state for the electronic device in response to the biometric data indicating that the user is in a non-available state and in response to determining that the electronic device is in a limited use state based on one or more activities being performed on the electronic device while the biometric data indicates that the user is in the non-available state; and performing the disruptive task at the rescheduled time in response to the biometric data indicating that the user is in the predetermined user state and in response to determining that the disruptive task can be completed within the estimated state duration and in response to the electronic device being idle.

10. The method of claim 9, wherein determining whether the user is in a predetermined user state using the biometric data comprises:

comparing the biometric data to a plurality of user state profiles;

identifying a user state from the comparison; and determining whether the identified user state matches the predetermined user state.

11. The method of claim 10, wherein the predetermined user state is one of sleep state and a state of physical exertion.

12. The method of claim 9, wherein determining whether the scheduled task is a disruptive task further comprises:

determining whether the scheduled task is included in a list of disruptive tasks.

13. The method of claim 9, wherein obtaining the biometric data comprises receiving biometric data captured by a biometrics device separate from the electronic device, wherein the biometric data is selected from the group consisting of: body temperature, heart rate, breathing rate, blood pressure, and body movement.

14. The method of claim 9, further comprising setting a user's presence value for a messaging application running on the electronic device in response to the biometric data indicating the predetermined user state.

15. The method of claim 9, further comprising storing biometric data history for the user, wherein estimating the state duration for the predetermined user state is based on the biometric data history.

16. A program product comprising a computer readable storage medium that is not a transitory signal and that stores code executable by a processor, the executable code comprising code to perform:
identifying a task that is scheduled to be performed at a computing device at a particular time, the task scheduled based on one or more of a calendar trigger and an idle time determination;
determining whether the scheduled task is a disruptive task based on an estimated system resource use of the scheduled task, wherein the scheduled task is determined to be a disruptive task in response to the estimated system resource use exceeding one or more system resource thresholds, the system resource comprising one or more of processor use, memory use, data storage retrieval rate, and network bandwidth;
obtaining biometric data of a user of the computing device;
determining whether the user is in a first user state using the biometric data;
postponing the disruptive task in response to the biometric data indicating a second user state;
estimating a state duration for the first user state in response to the user being in the first user state;
determining whether the disruptive task can be completed within the estimated state duration;
postponing the disruptive task in response to determining that the disruptive task cannot be completed within the estimated state duration;
determining whether a state of the computing device is an idle state;
postponing the disruptive task in response to the state of the computing device not being an idle state;
determining a new state of the computing device in response to the biometric data indicating that the user is in a non-available state and in response to determining that the computing device is in a limited use state based on one or more activities being performed on the computing device while the biometric data indicates that the user is in the non-available state; and
performing the disruptive task at the particular time in response to the biometric data indicating that the user is in the first user state and in response to determining that the disruptive task can be completed within the estimated state duration, wherein the first user state is a state where the user is unlikely to use the computing device during a time needed to complete performance of the disruptive task and in response to the computing device is idle.

17. The program product of claim 16, wherein obtaining the biometric data comprises receiving biometric data captured by a biometrics device separate from the computing device, wherein the biometric data is selected from the group consisting of: body temperature, heart rate, breathing rate, blood pressure, and body movement, and wherein the first user state is one of sleep and physical exercise.

18. The program product of claim 16, wherein the task is queued for execution on the apparatus, wherein determining whether the task is a disruptive task further comprises:
identifying an application initiating the task; and
determining whether the initiating application is included in a list of disruptive applications.

19. The program product of claim 16, further comprising code to perform storing biometric data history for the user, wherein estimating a state duration for the first user state is based on the biometric data history.

20. The program product of claim 16, further comprising code to perform identifying an application initiating the task, wherein determining whether the scheduled task is a disruptive task includes determining whether the initiating application is included in a list of disruptive applications.

* * * * *